(12) United States Patent
Oguchi

(10) Patent No.: US 8,897,166 B2
(45) Date of Patent: Nov. 25, 2014

(54) COMMUNICATION CONTROL DEVICE, COMMUNICATION CONTROL METHOD, AND COMPUTER-READABLE RECORDING MEDIUM

(71) Applicant: Fujitsu Limited, Kawasaki-shi (JP)

(72) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 13/779,140

(22) Filed: Feb. 27, 2013

(65) Prior Publication Data

US 2013/0223254 A1 Aug. 29, 2013

(30) Foreign Application Priority Data

Feb. 28, 2012 (JP) ................................ 2012-042571

(51) Int. Cl.
| | |
|---|---|
| *H04L 12/56* | (2006.01) |
| *H04L 29/02* | (2006.01) |
| *H04L 12/841* | (2013.01) |
| *H04L 12/54* | (2013.01) |
| *H04L 29/06* | (2006.01) |

(52) U.S. Cl.
CPC .............. *H04L 47/283* (2013.01); *H04L 12/56* (2013.01); *H04L 29/06* (2013.01)
USPC ............................. 370/252; 370/392; 370/465

(58) Field of Classification Search
CPC ....... H04L 47/283; H04L 47/56; H04L 47/28; H04L 47/29; H04L 12/56; H04L 29/06; H04L 29/02
USPC ................... 370/252, 300, 389–392, 401–474
See application file for complete search history.

(56) References Cited

U.S. PATENT DOCUMENTS

| | | | | |
|---|---|---|---|---|
| 5,384,770 | A | * | 1/1995 | Mays et al. .................... 370/300 |
| 8,774,030 | B2 | * | 7/2014 | Barr et al. ...................... 370/252 |
| 2007/0110087 | A1 | * | 5/2007 | Abel et al. ..................... 370/412 |
| 2008/0259947 | A1 | * | 10/2008 | Krishnamurthy ............. 370/412 |

FOREIGN PATENT DOCUMENTS

| | | | |
|---|---|---|---|
| JP | 2010-074279 | | 4/2010 |
| JP | 2010074279 A | * | 4/2010 |

* cited by examiner

*Primary Examiner* — Afsar M Qureshi
(74) *Attorney, Agent, or Firm* — Fujitsu Patent Center

(57) ABSTRACT

A communication control device measures a size of burst data transmitted from a first device through the use of a predetermined protocol in a transport layer. The communication control device selects a protocol ruled by an algorithm with the smallest latency, which is estimated from the measured size of burst data and characteristics of a network, from among plural protocols used in the transport layer. The communication control device terminates the communication of the burst data transmitted through the predetermined protocol from the first device and transmits the burst data to a destination through the use of the selected protocol.

8 Claims, 15 Drawing Sheets

FIG.3

| ID | TCP SESSION ||||  AVERAGE BURST LENGTH (Bytes) | AVERAGE RTT (ms) | AVERAGE DROP RATE (%) |
|---|---|---|---|---|---|---|---|
| | SRC IP | SRC PORT | DST IP | DST PORT | | | |
| 1 | IP(A) | 3389 | IP(B) | 1801 | 15000 | 50 | 0.001 |
| 2 | IP(A) | 3389 | IP(C) | 2002 | 10000 | 50 | 0.001 |

| BURST SIZE=15000 bytes | | DROP RATE (p) | | | | | |
|---|---|---|---|---|---|---|---|
| | | 0.05 > p | 0.05 ≤ p | 0.1 > p | 0.1 ≤ p | 0.2 > p | 0.2 ≤ p |
| RTT(ms) | 50 ms | CUBIC | Scalable | Scalable | Scalable | Scalable | Scalable |
| | 100 ms | CUBIC | CUBIC | CUBIC | Scalable | Scalable | Scalable |
| | 200 ms | CUBIC | CUBIC | CUBIC | CUBIC | CUBIC | Scalable |

FIG.11

| BURST SIZE=15000 bytes | | DROP RATE [p] | | | | | | |
|---|---|---|---|---|---|---|---|---|
| | | p < 0.0001 | 0.05 > p | 0.05 ≤ p | 0.1 > p | 0.1 ≤ p | 0.2 > p | 0.2 ≤ p |
| RTT(ms) | 50 ms | UN-CERTAIN | CUBIC | Scalable | Scalable | Scalable | Scalable | Scalable |
| | 100 ms | CUBIC | CUBIC | CUBIC | Scalable | Scalable | Scalable | Scalable |
| | 200 ms | CUBIC | CUBIC | CUBIC | CUBIC | CUBIC | CUBIC | Scalable |

|  |  | DROP RATE [p] | | | | |
|---|---|---|---|---|---|---|
|  |  | p < 0.08 | 0.08 ≤ p p < 0.1 | 0.1 ≤ p | P < 0.2 | 0.2 ≤ p |
| RTT(ms) | 50 ms | Scalable | CUBIC | CUBIC | CUBIC | CUBIC |
|  | 100 ms | Scalable | Scalable | Scalable | CUBIC | CUBIC |
|  | 200 ms | Scalable | Scalable | Scalable | Scalable | Scalable | CUBIC |

COMMUNICATION CONTROL DEVICE, COMMUNICATION CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2012-042571, filed on Feb. 28, 2012, the entire contents of which are incorporated herein by reference.

FIELD

The embodiments discussed herein are related to a communication control device, a communication control method, and a communication control program.

BACKGROUND

Cloud systems which are accessed by clients by causing a data center to operate a server have increased more and more. The data centers of the cloud systems are often located geographically far away or abroad. Accordingly, in the cloud systems, there is a tendency that a round trip time (RTT) between a client terminal and a server becomes more significant.

In an environment with a large RTT, when a transmission control protocol (TCP) communication is carried out, dropping of data causes reduction of throughput. This is caused by TCP characteristics that a long time is taken until the throughput is recovered after the throughput has once been lowered due to occurring of congestion. In general, the TCP adjusts the throughput by changing the size of a congestion window (cwin) on the basis of the congestion.

The methods of controlling a congestion window in the TCP are broadly classified into two types. One type is a congestion control algorithm of enlarging the congestion window depending on the number of ACKs received from a destination and an example thereof is a scalable algorithm. The other type is a congestion control algorithm of increasing the congestion window depending on the elapsed time from the generation of congestion and an example thereof is a cubic algorithm.

Recently, as a countermeasure for improvement of the throughput in an environment with a larger RTT, devices such as a wide area network (WAN) speed-up device have been used. The WAN accelerator is a device improving a decrease in average throughput of the TCP by replacing the TCP of an end device with a protocol having a higher line utilization rate and performing a communication. The WAN accelerator may be a dedicated appliance or may be a virtual appliance which is virtually executed on a computer or the like.

For example, in a cloud system, a WAN accelerator A and a WAN accelerator B are arranged with a network such as a WAN line connecting a server and a terminal interposed therebetween. The WAN accelerator A temporarily terminates a TCP session accepted from the terminal. Then, the WAN accelerator A replaces data received through the TCP session with speeded-up protocol (hereinafter, also referred to as a high-speed protocol) data and transmits and receives the replaced data to and from the opponent WAN accelerator B. Thereafter, the WAN accelerator B restores the data transmitted to and received from the opponent WAN accelerator A through the high-speed protocol to the normal TCP data and transmits the restored normal TCP data to the server.

A protocol obtained by improving a user datagram protocol (UDP) to add a retransmission control function or a congestion control function thereto or a protocol obtained by more efficiently improving the congestion control function of the existing TCP is used as the high-speed protocol. For example, a UDT (UDP-based data transfer) protocol is known as the UDP based protocol. A CUBIC protocol or a Scalable protocol is known as the improved TCP. Particularly, the Scalable TCP is a protocol dedicated to a recent WAN line with a large RTT.

Patent Document 1: Japanese Laid-open Patent Publication No. 2010-74279

However, in the related art, there is a problem in that it is difficult to improve the latency for communications of transactions requiring a quick response.

Specifically, the WAN accelerator according to the related art uses a high-speed protocol with the maximum average throughput for communications in which a large amount of data are transmitted like bulk transfer and ACKs are frequently returned.

For example, in the bulk transfer, expected performance can be achieved by using the Scalable TCP more than the Cubic TCP, because the enlargement of a congestion window is more aggressive and the average window size is larger. Since the Cubic TCP enlarges the congestion window with the elapse of time after the congestion window has been reduced due to the occurrence of congestion, much time is taken until the congestion window is restored to the original state. That is, much time is taken until the average throughput reaches a desired value.

From this point of view, the WAN accelerator according to the related art often uses the Scalable TCP as a high-speed protocol with the maximum average throughput. However, in burst transmission like transactions, since the number of packets is small and the number of ACKs is also accordingly small, it is difficult to achieve desired performance through the use of the Scalable TCP. That is, since the WAN accelerator according to the related art often uses the Scalable TCP, it is difficult to say that the latency is improved for transaction communications requiring a quick response.

SUMMARY

According to an aspect of the embodiments, a communication control device comprising: a memory; and a processor coupled to the memory, wherein the processor executes a process including: first measuring a size of burst data transmitted from a first device through the use of a predetermined protocol in a transport layer; selecting a protocol ruled by an algorithm with the smallest latency, which is estimated from the size of burst data measured at the first measuring and characteristics of a network, from among a plurality of protocols used in the transport layer, and terminating the communication of the burst data transmitted through the predetermined protocol from the first device and transmitting the burst data to a destination through the use of a protocol with the smallest latency selected at the selecting.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a session monitoring table;

FIG. 11 is a diagram illustrating an example of an algorithm determining table according to the second embodiment;

DESCRIPTION OF EMBODIMENTS

Preferred embodiments will be explained with reference to accompanying drawings.

The present invention is not limited to these embodiments.

[a] First Embodiment

Overall Configuration

Figure 1:
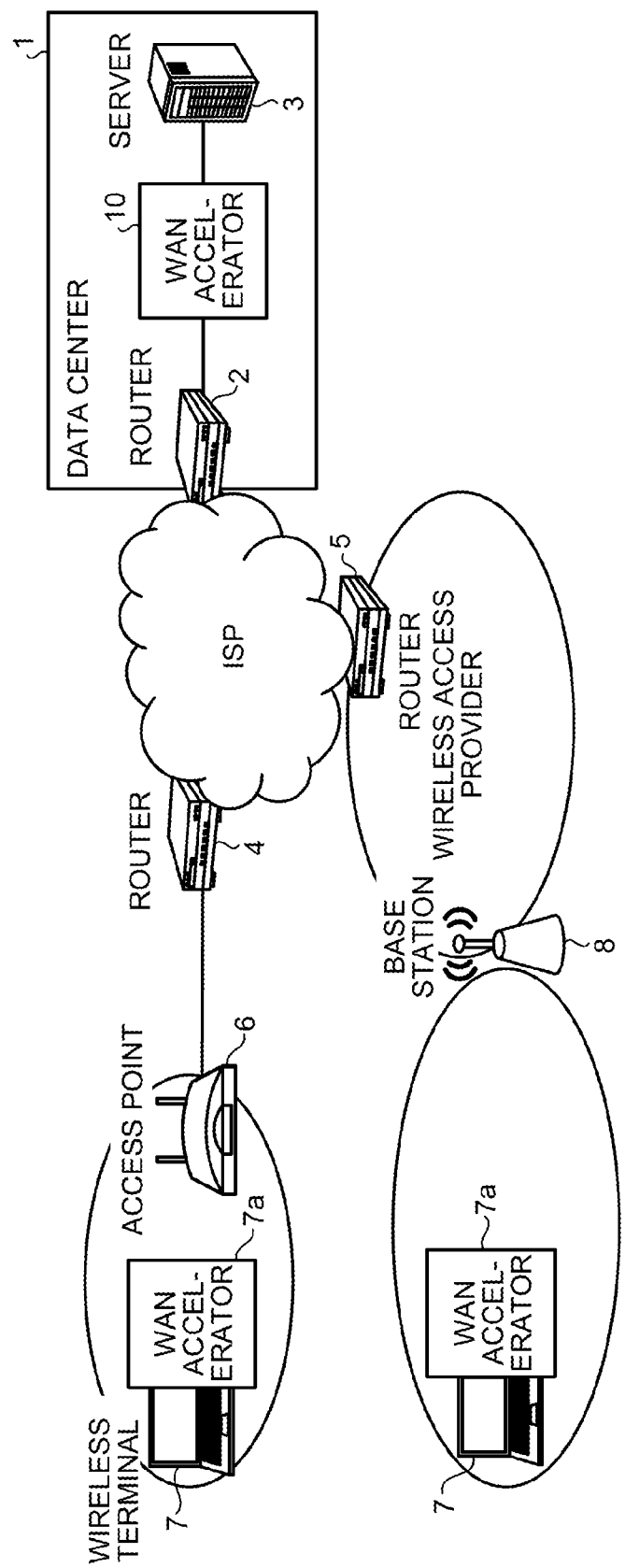
FIG. 1 is a diagram illustrating an example of the overall configuration of a communication system according to a first embodiment.

FIG. 1 is a diagram illustrating an example of the overall configuration of a communication system according to the first embodiment. As illustrated in FIG. 1, in the communication system, a wireless terminal 7 performs a TCP communication with a server 3 of a data center 1 through the use of a WAN (Wide Area Network) line provided by an ISP (Internet Services Provider). Here, for example, it is assumed that the wireless terminal 7 accesses the server 3 using a remote desktop application and displays a desktop screen on the server 3.

In FIG. 1, a LAN (Local Area Network) of the data center 1, a wireless network provided from a wireless access provider, a network provided from an access provider are connected to the WAN line provided from the ISP.

The data center 1 includes a router 2, a server 3, and a WAN accelerator 10. The router 2 is a relay that relays the ISP and the LAN of the data center 1. The server 3 is a server that receives a remote desktop access from the wireless terminal 7 and that transmits a variety of information to the wireless terminal 7. The WAN accelerator 10 is a device that replaces a TCP of an end device with a protocol having a higher line utilization rate and that performs a communication operation.

The wireless network provided from the wireless access provider is connected to the WAN line via a router 5. The wireless network is used by the wireless terminal via a base station 8. Here, the base station 8 can be accessed through a WiMAX (Worldwide Interoperability for Microwave Access).

The network provided from the access provider is connected to the WAN line via a router 4. The router 4 is connected to an access point 6 through FTTH (Fiber To The Home). The wireless terminal 7 accesses the access point 6 using Wi-Fi (wireless fidelity) and is connected to the WAN line via the access point 6. The wireless terminal 7 implements a WAN accelerator 7a virtually-performing the same function as the WAN accelerator 10.

In this way, the communication system illustrated in FIG. 1 is a system in which the WAN accelerator 10 and the virtual WAN accelerator 7a are opposite to each other. In this embodiment, it is assumed that a user of the wireless terminal 7 moves from indoor to outdoor during communication and is handed over from indoor Wi-Fi to WiMAX as a public wireless access network. In general, Wi-Fi is often used in an area narrower than WiMAX and is often superior in communication quality. Accordingly, in this embodiment, it is assumed that the drop rate greatly varies by switching Wi-Fi to WiMAX. Since WiMAX has a retransmission mechanism in a wireless layer, a round trip time (RTT) between the wireless terminal 7 and the server 3 is greater than that of Wi-Fi.

In this state, the WAN accelerator 10 measures the size of burst data transmitted from the server 3 through the use of a TCP which is a predetermined protocol in a transport layer. Then, the WAN accelerator 10 selects a protocol working in accordance with an algorithm with small latency, which is estimated from the measured size of burst data and characteristics of the network, out of plural protocols used in the transport layer. Thereafter, the WAN accelerator 10 terminates the communication of burst data transmitted from the server 3 using the TCP and transmits the burst data to a destination using the selected protocol. The WAN accelerator 10 terminates data transmitted from the wireless terminal 7 and transmits the data to the server 3 using the TCP.

In this way, the WAN accelerator 10 can select a protocol with small latency from the data size at the time of transmission of burst data and the characteristics of the network and transmit the burst data, which is received using the TCP, using the selected protocol. As a result, the latency for the communication of transactions requiring a high-speed response can be improved.

Configuration of WAN Speed-Up Device

Figure 2:
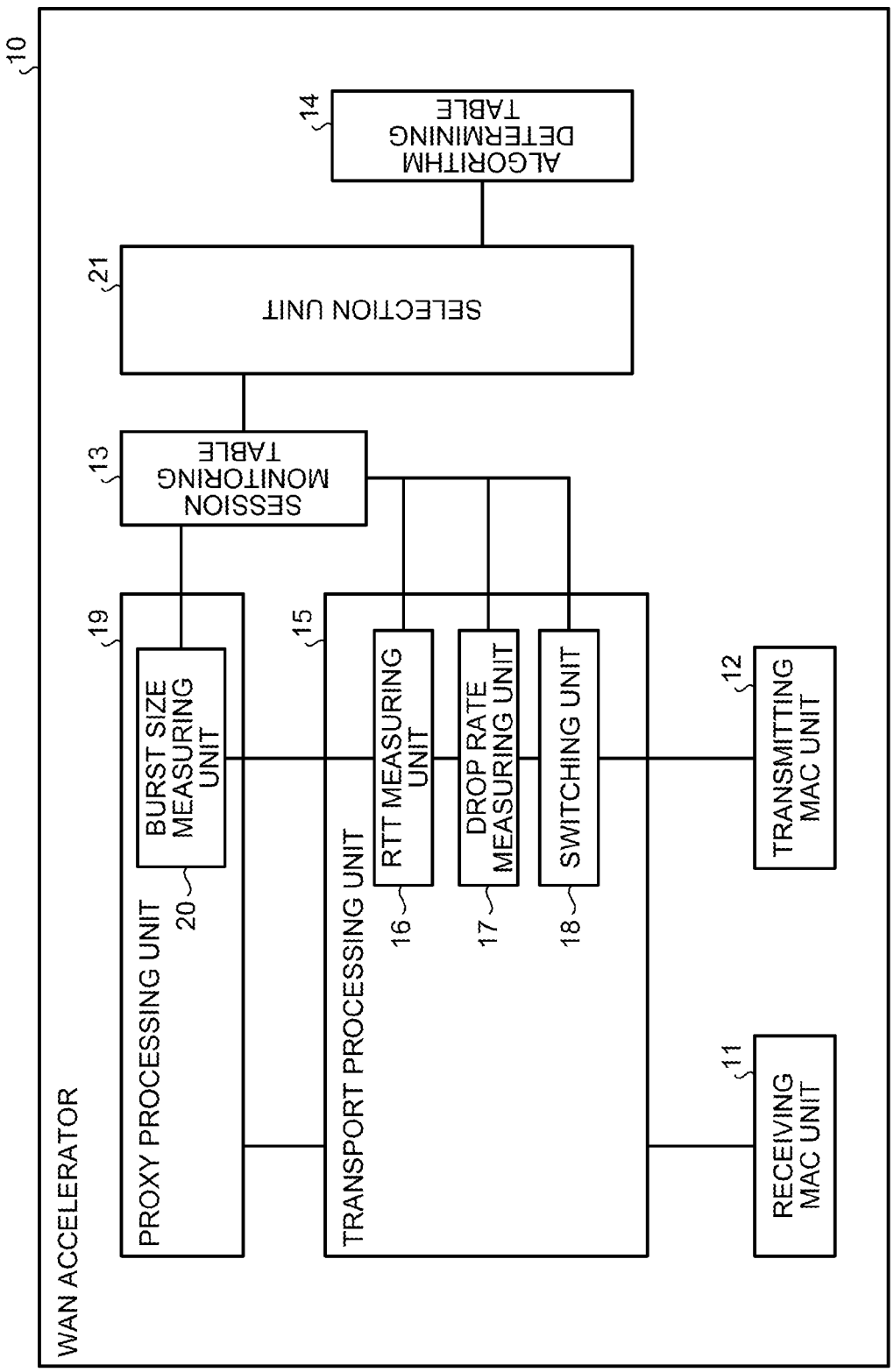
FIG. 2 is a functional block diagram illustrating the functional configuration of a WAN accelerator according to the first embodiment.

FIG. 2 is a functional block diagram illustrating the functional configuration of the WAN accelerator according to the first embodiment. The virtual WAN accelerator 7a implemented by the wireless terminal 7 performs the same processes as described with reference to FIG. 2.

As illustrated in FIG. 2, the WAN accelerator 10 includes a receiving MAC (Media Access Control) unit 11, a transmitting MAC unit 12, a session monitoring table 13, an algorithm determining table 14, a transport processing unit 15, a proxy processing unit 19, and a selection unit 21. The session monitoring table 13 and the algorithm determining table 14 are stored in a storage device such as a memory. The respective processing units are processing units implemented by an electronic circuit such as a CPU (Central Processing Unit).

The receiving MAC unit 11 is a processing unit that performs a MAC process on received data. For example, the receiving MAC unit 11 receives data, which is transmitted from the wireless terminal 7, via the router 2 and outputs the received data to the transport processing unit 15. The receiving MAC unit 11 receives data, which is transmitted from the server 3, via the router 2 and outputs the received data to the transport processing unit 15.

The transmitting MAC unit 12 is processing unit that performs a MAC process on data to be transmitted. For example, the transmitting MAC unit 12 transmits data, which is transmitted from the wireless terminal 7, to the server 3 using a TCP. The transmitting MAC unit 12 transmits data, which is transmitted from the server 3, to the wireless terminal 7 using the protocol designated by a switching unit 18.

The session monitoring table 13 stores information of a TCP session between the server 3 and the wireless terminal 7, that is, session information of a network between the WAN accelerator 10 and the WAN accelerator 7a. The information to be stored here is updated by an RTT measuring unit 16, a drop rate measuring unit 17, a burst size measuring unit 20, and the like to be described later. FIG. 3 is a diagram illustrating an example of the session monitoring table. As illustrated in FIG. 3, the session monitoring table 13 stores "ID, TCP session, average burst length (Bytes), average RTT (ms), and average drop rate (%)" in correlation with each other.

The "ID" to be stored here represents an identifier for identifying a record of the session monitoring table 13. The "TCP session" includes "SRC IP, SRC Port, DST IP, and DST Port". The "SRC IP" represents address information of a destination device. The "SRC Port" represents a port number used for the destination device to transmit data. The "DST IP" represents address information of a receiving device. The "DST Port" represents a port number used for the receiving device to receive data. The "average burst length" represents an average size of burst data transmitted and received through the TCP session. The "average RTT" represents an average value of latency when data is transmitted and received through the TCP session. The "average drop rate" represents an average value of the drop rate of data when data is transmitted and received through the TCP session.

A record "ID=1" will be described as an example of FIG. 3. This record is information of a session in which data is transmitted from a device with an address of IP(A) at a port number 3389 and is received by a device with an address of IP(B) at a port number 1801. In this session, the average burst length 15000 bytes, the average RTT is 50 ms, and the average drop rate is 0.001%.

Figures 4, 5:
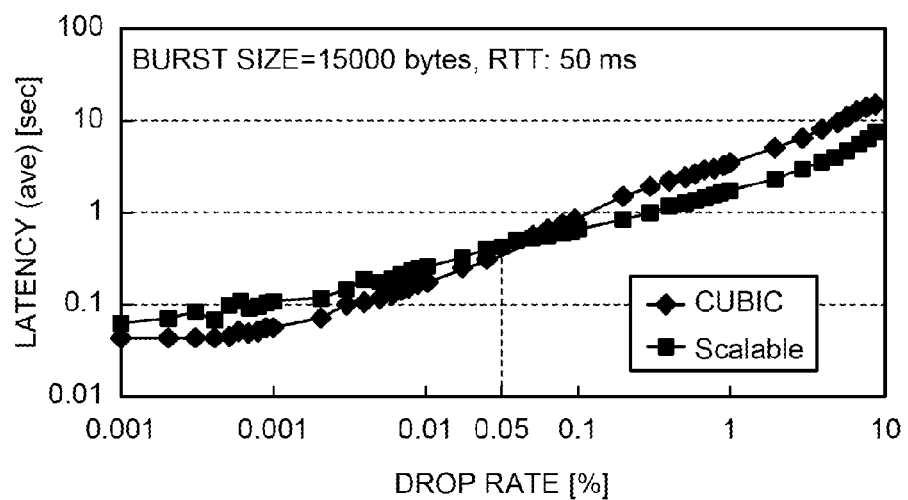
FIG. 4 is a diagram illustrating an example of an algorithm determining table.
FIG. 5 is a diagram illustrating an example of a simulation result used to prepare the algorithm determining table.

The algorithm determining table 14 stores information used to determine a protocol used in WAN high-speed communications. The algorithm determining table 14 stores information used to determine a protocol from a drop rate and an RTT for each burst size. FIG. 4 is a diagram illustrating an example of the algorithm determining table. The example illustrated in FIG. 4 provides information corresponding to the burst size of 15000 bytes. As illustrated in FIG. 4, the algorithm determining table 14 stores information used to uniquely determine a protocol from the drop rate (p) and the RTT (ms).

FIG. 4 illustrates which of the CUBIC TCP and the Scalable TCP is selected when 0.05>p, 0.05≤p, 0.1>p, 0.1≤p, 0.2>p, and 0.2≤p are satisfied for each RTT of 50 ms, 100 ms, and 200 ms. For example, when the RTT is 50 ms and the drop rate (p) satisfies 0.1≤p<0.2, the Scalable TCP is selected. When the RTT is 100 ms and the drop rate (p) satisfies p≤0.05, the CUBIC TCP is selected.

Preparation of the algorithm determining table 14 illustrated in FIG. 4 will be described below. The algorithm determining table 14 can be prepared from the simulation result of transmission of burst data. This technique is effective in the case where many uncertain factors are present for specifying a network or the like.

Figure 6:
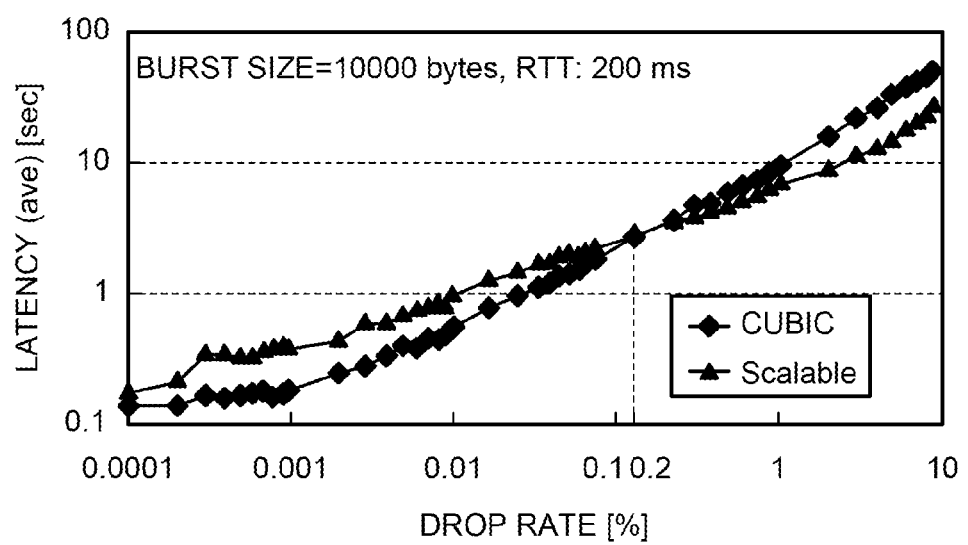
FIG. 6 is a diagram illustrating an example of a simulation result used to prepare the algorithm determining table.

FIGS. 5 and 6 are diagrams illustrating examples of the simulation result used to prepare the algorithm determining table. FIG. 5 is a diagram illustrating the relationship between the drop rate and the latency when the burst size is 15000 bytes and the RTT is 50 ms. FIG. 6 is a diagram illustrating the relationship between the drop rate and the latency when the burst size 15000 bytes and the RTT is 200 ms.

In FIG. 5, the latency of the CUBIC is smaller than that of the Scalable when the drop rate is smaller than 0.05, and the latency of the Scalable is smaller than that of the CUBIC when the drop rate is greater than or equal to 0.05. As a result, as illustrated in FIG. 4, the algorithm determining table 14 is prepared so that the selected protocol is switched with the drop rate of 0.05 as a boundary.

In FIG. 6, the latency of the CUBIC is smaller than that of the Scalable when the drop rate is smaller than 0.2, and the latency of the Scalable is smaller than that of the CUBIC when the drop rate is greater than or equal to 0.2. As a result, as illustrated in FIG. 4, the algorithm determining table 14 is prepared so that the selected protocol is switched with the drop rate of 0.2 as a boundary.

Referring to FIG. 2 again, the transport processing unit 15 is a processing unit that includes an RTT measuring unit 16, a drop rate measuring unit 17, and a switching unit 18 and that transmits and receives data to be transmitted and received by an application using the TCP. When data transmitted from the wireless terminal 7 using a protocol other than the TCP is received by the receiving MAC unit 11, the transport processing unit 15 instructs the transmitting MAC unit 12 to switch the protocol to the TCP and to transmit the data to the server 3.

The RTT measuring unit 16 is a processing unit that measures a round trip time from the time at which the data is transmitted and the time at which a response to the data is received. The RTT measuring unit 16 calculates an average RTT whenever measuring the round trip time and updates the average RTT stored in the session monitoring table 13 in correlation with the corresponding TCP session.

For example, when burst data including 10 packets is transmitted, the RTT measuring unit 16 measures the time (RTT) until a response is received after the burst data is transmitted for each packet. The RTT measuring unit 16 averages the RTTs of the 10 packets and sets the averaged value as an average value of the burst data. Thereafter, the RTT measuring unit 16 calculates a new average value using the previous average value and the presently calculated average value and updates the average RTT stored in the session monitoring table 13.

The method of calculating the average value can employ various known methods, and a method of giving priority to the latest average value can be used as an example. An example of calculating a new average value RTT(A) using the previously calculated average value RTT(previous) and the presently calculated average value RTT(present) will be described below. In this case, the RTT measuring unit 16 can be calculated as "RTT(A)=(1−α) RTT(previous)+αRTT(present)" (where α is a fixed value).

The drop rate measuring unit 17 is a processing unit that measures a ratio of lost packets based on whether or not a response to transmitted data is received. That is, the drop rate measuring unit 17 measures the probability when a response thereto is not received after a TCP packet is transmitted in a certain period. The drop rate measuring unit 17 updates the average drop rate stored in the session monitoring table 13 in correlation with the corresponding TCP session whenever calculating the drop rate.

For example, it is assumed that burst data-1 including 10 packets and burst data-2 including 5 packets are sequentially transmitted in a certain period A. It is also assumed that one packet of burst data-1 is lost and two packets of burst data-2 are lost. In this case, the drop rate measuring unit 17 calculates the total number of packets "15" of burst data-1 and burst data-2 and calculates the total number of lost packets "3" of burst data-1 and burst data-2. Then, the drop rate measuring unit 17 calculates "3/15=0.2" as the drop rate in the period A. Thereafter, the drop rate measuring unit 17 calculates the average drop rate using the same method as described for the RTT measuring unit 16 and updates the average drop rate stored in the session monitoring table 13.

The switching unit 18 is a processing unit that receives a signal from a selection unit 21 to be described later and that switches a protocol to be used. For example, when it is notified from the selection unit 21 that the CUBIC is to be used, the switching unit 18 instructs the transmitting MAC unit 12 to transmit data to the wireless terminal 7 using the CUBIC. As a result, the transmitting MAC unit 12 transmits the data, which is received using the TCP, using the CUBIC.

The proxy processing unit 19 is a processing unit that includes a burst size measuring unit 20 and that terminates a communication session set up between the wireless terminal 7 and the server 3 and sets up a new communication session between the WAN accelerator 7a and the WAN accelerator 10 which are opponents to each other. For example, the proxy processing unit 19 terminates the TCP session set up between the wireless terminal 7 and the server 3. Then, the proxy processing unit 19 sets up a new session between the WAN accelerator 7a and the WAN accelerator 10 which are opponents to each other. The transmitting MAC unit 12 transmits data using the protocol instructed by the switching unit 18 through the new session.

The burst size measuring unit 20 is a processing unit that measures an average burst length and a burst gap of burst data to be transmitted through the communication session. Here, the burst gap is defined as a gap between the time at which a first packet of a certain burst is transmitted and the time at which a first packet of a subsequent burst is transmitted. The burst size measuring unit 20 updates the average burst length stored in the session monitoring table 13 in correlation with the corresponding TCP session whenever calculating the average burst length.

Specifically, the burst size measuring unit 20 monitors plural TCP packets continuously transmitted and measures the burst size. The burst size measuring unit 20 determines that when continuous TCP packets are transmitted in the time not exceeding a TCP timeout time (RTO), these packets constitute one burst, and sets the total data length hitherto as a burst size. For example, it is assumed that the RTO is 5 ms, burst data-2 is transmitted in 2 ms after burst data-1 is transmitted, and burst data-3 is transmitted in 7 ms after burst data-2 is transmitted. In this case, the burst size measuring unit 20 determines burst data-1 and burst data-2 to be one burst.

For example, it is assumed that burst data-1 and burst data-2 are determined to be one burst, the size of burst data-1 is 15000 bytes, and the size of burst data-2 is 10000 bytes. In this case, the burst size measuring unit 20 calculates "(15000+10000)/2=12500" as the average burst length. Thereafter, the burst size measuring unit 20 calculates the average burst length using the same method as described for the RTT measuring unit 16 and updates the average burst length stored in the session monitoring table 13.

The selection unit 21 is a processing unit that monitors the session monitoring table 13 and that selects the optimal TCP congestion control algorithm. Specifically, the selection unit 21 selects the optimal TCP congestion control algorithm even during communication illustrated in FIG. 4 on the basis of the information acquired by the RTT measuring unit 16, the drop rate measuring unit 17, and the burst size measuring unit 20, switches the algorithm, and performs a communication.

Description will be made with reference to FIGS. 3 and 4. Here, the session of ID=1 in the session monitoring table 13 will be described as an example, but the same process is performed on each session stored in the session monitoring table 13.

The selection unit 21 refers to the session monitoring table 13 at a predetermined time. The selection unit 21 acquires the average burst length "15000", the average RTT "50", and the average drop rate "0.001" of ID=1. The selection unit 21 searches the algorithm determining table 14 for a table corresponding to the acquired average burst length "15000". Then, the selection unit 21 specifies the "CUBIC" as a protocol corresponding to the average RTT "50" and the average drop rate "0.001" in the table illustrated in FIG. 4 acquired through the search. The selection unit 21 specifies the address "IP(B)" of a destination in the session of ID=1. Thereafter, the selection unit 21 instructs the switching unit 18 to utilize the CUBIC instead of the TCP for data with the address "IP(B)" as a destination in the session of ID=1. That is, the selection unit 21 instructs the switching unit 18 to switch the communication protocol from the TCP to the CUBIC.

Flowchart

Figure 7:
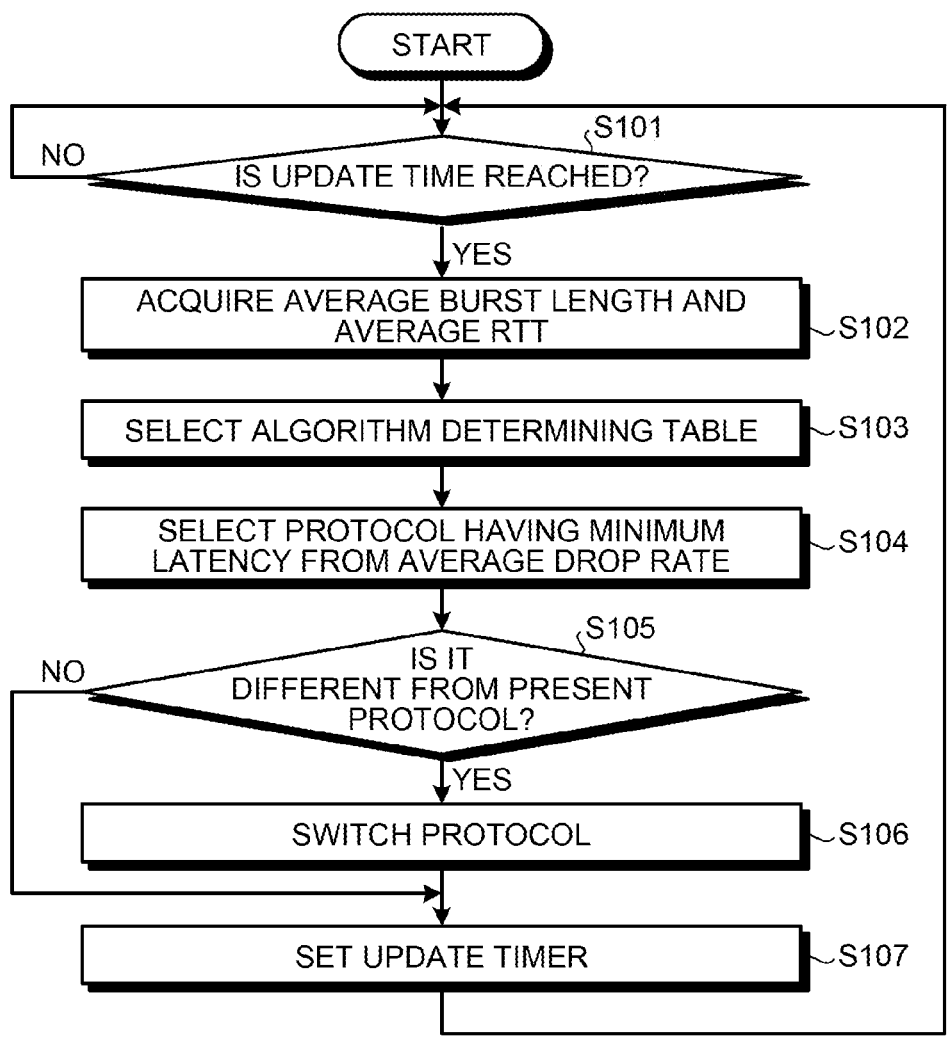
FIG. 7 is a flowchart illustrating the flow of processes which are performed by the WAN accelerator according to the first embodiment.

FIG. 7 is a flowchart illustrating the flow of processes performed by the WAN accelerator according to the first embodiment. As illustrated in FIG. 7, the selection unit 21 of the WAN accelerator 10 acquires an average burst length and an average RTT of a corresponding session from the session monitoring table 13 (S102) when the update time is out, that is, when the update time is reached (YES in S101). This update time serves as a trigger to re-check a transport algorithm depending on the network quality every fixed period.

Subsequently, the selection unit 21 selects an algorithm determining table corresponding to the acquired average burst length and average RTT out of plural tables of the algorithm determining table 14 (S103).

Thereafter, the selection unit 21 acquires an average drop rate of the corresponding session from the session monitoring table 13 and selects a protocol corresponding to the acquired average drop rate from the selected algorithm determining table (S104). That is, the selection unit 21 selects a protocol with the smallest latency based on the average burst length, the average RTT, and the average drop rate.

The selection unit 21 determines whether the selected protocol is different from the present protocol (S105). Then, the selection unit 21 outputs an instruction of switching to the selected protocol to the switching unit (S106) when it is determined that the selected protocol is different from the present protocol (YES in S105).

Thereafter, the selection unit 21 sets an update timer for measuring a trigger for executing the flow illustrated in FIG. 7 and ends the flow of processes (S107). The selection unit 21 outputs a switching instruction of the protocol to the switching unit 18 to perform the process of S107 when it is determined that the selected protocol is not different from the present protocol (NO in S105).

Sequence

Figure 8:
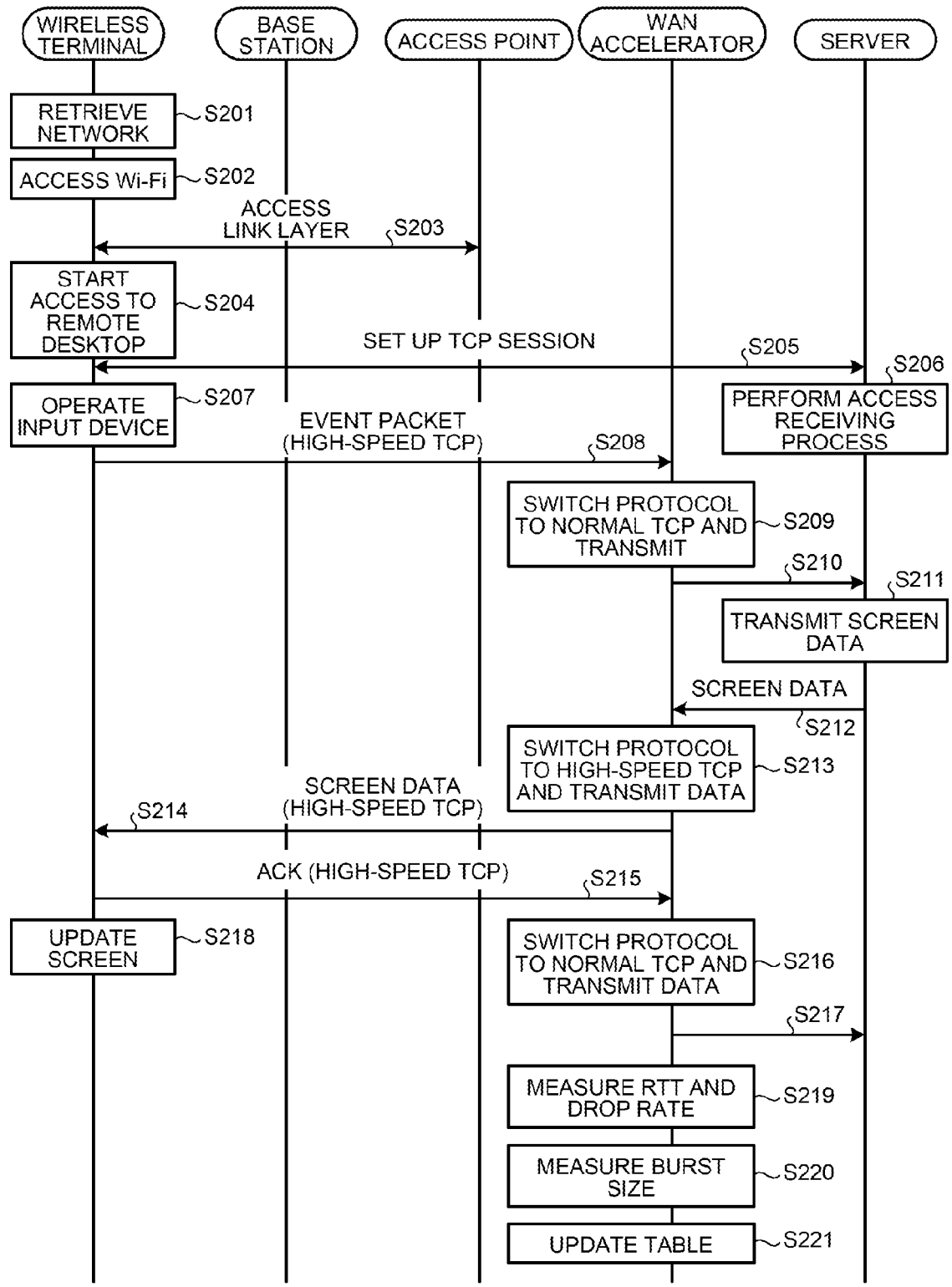
FIG. 8 is a sequence diagram of the communication system according to the first embodiment.
Figure 9:
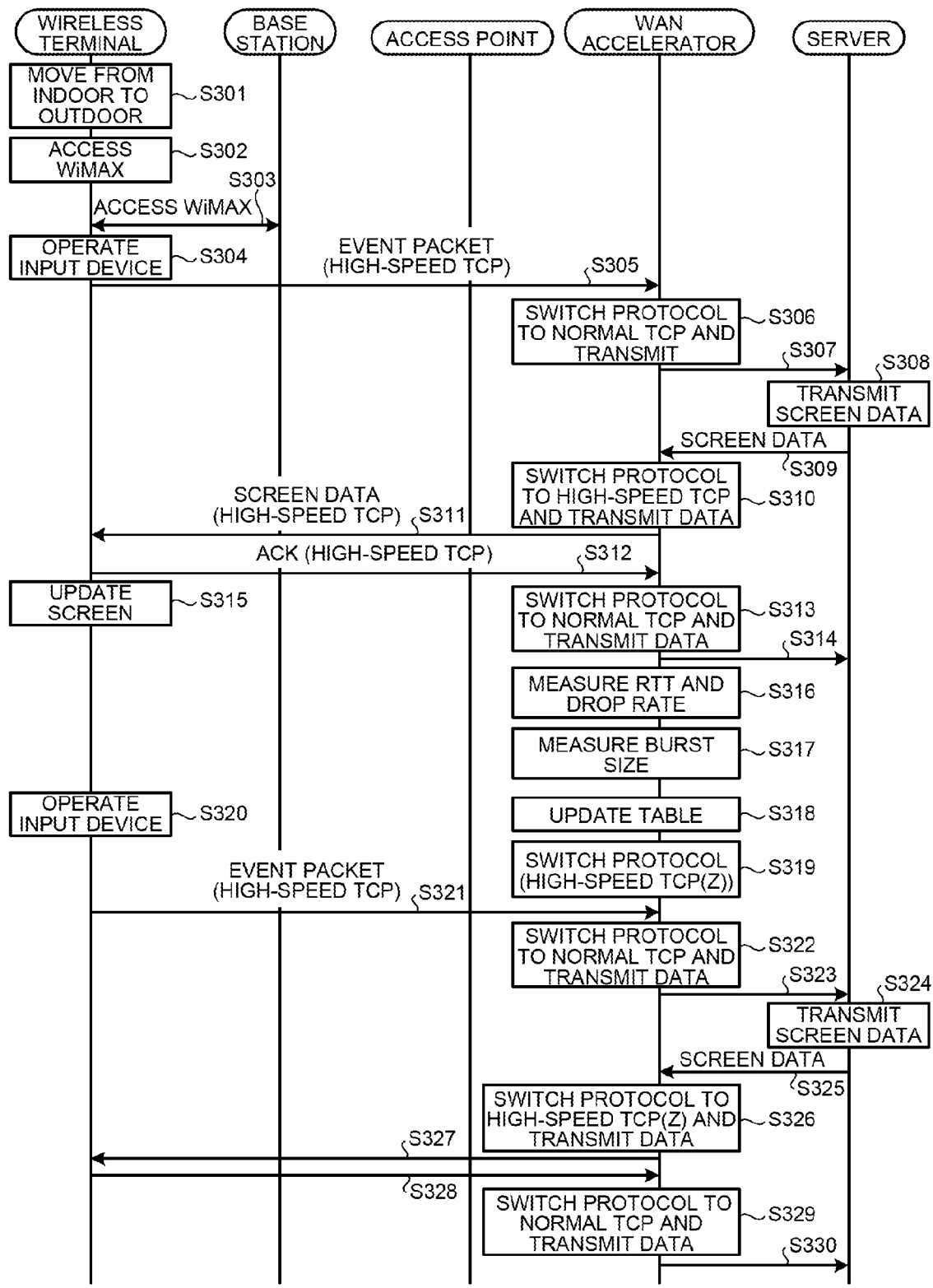
FIG. 9 is a sequence diagram of the communication system according to the first embodiment.

FIGS. 8 and 9 are sequence diagrams of the communication system according to the first embodiment. Here, it is assumed that the wireless terminal 7 is a mobile communication device and a user moves from indoor to outdoor during communication to cause a handover between the access point (AP) 6 and the base station 8.

As illustrated in FIG. 8, when it is turned on, the wireless terminal 7 scans surrounding electric waves and retrieves usable networks (S201). Then, when an electric wave transmitted from the base station 8 of WiMAX and an electric wave transmitted from the AP 6 of Wi-Fi are retrieved and the electric wave of Wi-Fi is stronger, the wireless terminal 7 determines to use Wi-Fi and accesses the AP 6 (S202). At this time, the wireless terminal 7 performs an initial access sequence to the AP 6 and accesses a link layer (S203).

Thereafter, the wireless terminal 7 transmits a SYN packet which is a TCP setup message to the server 3 (S204) when a communication application starts an access to the server 3. On the other hand, when the server 3 transmits an SYNACK packet and the wireless terminal 7 receives the SYNACK packet, the wireless terminal 7 transmits an ACK and thus a TCP connection is set up between the server 3 and the wireless terminal 7 (S205 and S206).

When the access to a remote desktop is completed, a desktop screen of the server 3 is displayed on the wireless terminal 7 and the wireless terminal 7 transmits events of a mouse operation or a keyboard operation on the screen along with packets to the server (S207 and S208). At this time, the WAN accelerator 7a of the wireless terminal 7 switches the communication protocol to a TCP (hereinafter, also referred to as a high-speed TCP) with a higher throughput or smaller latency than that of a normal TCP and transmits the event packets using the high-speed TCP.

The transport processing unit 15 of the WAN accelerator 10 switches the communication protocol to the normal TCP and transmits the received event packets to the server 3 using the normal TCP (S209 and S210). That is, the proxy processing unit 19 of the WAN accelerator 10 receives the event packets transmitted from the wireless terminal 7 and terminates the session.

The server 3 performs a process of an application on the events specified by the received event packets, updates the screen, and transmits the updated screen data to the wireless terminal 7 (S211). At this time, plural TCP packets including the screen data depending on the size of the screen data are transmitted from the server 3 to the wireless terminal 7 and an ACK is transmitted from the wireless terminal 7 for each packet (S212 to S217). The wireless terminal 7 updates the screen with the received data when receiving the screen data (S218).

The processes of S212 to S217 will be specifically described below. The proxy processing unit 19 of the WAN accelerator 10 terminates the packets transmitted from the server 3 using the TCP. The transport processing unit 15 transmits the packets, which are received using the normal TCP, to the wireless terminal 7 using a high-speed TCP designated as a default. The WAN accelerator 7a of the wireless terminal 7 transmits the packets, which are received using the high-speed TCP, to the application using the normal TCP. The application performs an image display process.

Thereafter, the WAN accelerator 7a of the wireless terminal 7 transmits the ACK output from the application to the server 3 using the high-speed TCP. The proxy processing unit 19 of the WAN accelerator 10 terminates the ACK transmitted from the wireless terminal 7 using the high-speed TCP. Then, the transport processing unit 15 transmits the received ACK to the server 3 using the normal TCP. In this way, data is transmitted and received between the wireless terminal 7 and the server 3 using both the normal TCP and the high-speed TCP.

Referring to FIG. 8 again, the RTT measuring unit 16 and the drop rate measuring unit 17 of the WAN accelerator 10 monitor a TCP packet including data transmitted from the server 3 to the wireless terminal 7 and an ACK to the TCP packet and measure the RTT and the drop rate (S219). The burst size measuring unit 20 of the WAN accelerator 10 monitors plural TCP packets continuously transmitted in S212 to S217 and measures the burst size (S220). Here, whether the TCP packets belong to the same burst is determined depending on whether the transmission interval of the TCP packets exceeds the TCP timeout. Thereafter, the WAN accelerator 10 updates the average burst length, the average RTT, and the average drop rate of the session monitoring table 13 using the measured RTT, the measured drop rate, and the measured burst size (S221).

Thereafter, as illustrated in FIG. 9, it is assumed that the wireless terminal 7 moves from indoor to outdoor (S301). Since the wireless terminal 7 is not able to receive the electric wave of the AP 6, the wireless terminal 7 searches the networks again, detects an electric wave from the base station 8 of WiMAX, and hands over to the WiMAX (S302 and S303). It is assumed that the access of a wireless link layer through the handover is switched from the AP 6 of Wi-Fi to the base station 8 of WiMAX, but the TCP session between the wireless terminal 7 and the server 3 is maintained without any change. The wireless communication quality degrades due to the switching to the WiMAX.

Subsequently, when the input device of the wireless terminal 7 is operated, the wireless terminal 7 transmits an event packet to the server 3 (S304 and S305). At this time, the WAN accelerator 7a of the wireless terminal 7 switches the communication protocol to a high-speed TCP and transmits the event packet using the high-speed TCP.

The transport processing unit 15 of the WAN accelerator 10 switches the communication protocol to the normal TCP and transmits the received event packet to the server 3 using the normal TCP (S306 and S307). The server 3 performs a process of an application on the event specified by the received event packet to update the screen and transmits the updated screen data to the wireless terminal 7 (S308). At this time, plural TCP packets including screen data depending on the size of the screen data are transmitted from the server 3 to the wireless terminal 7 and an ACK is transmitted from the wireless terminal 7 for each TCP packet (S309 to S314). These processes are the same as the processes of S212 to S217 and thus the detailed description thereof will not be repeated. The wireless terminal 7 updates the screen with the received data (S315) when receiving the screen data.

The RTT measuring unit 16 and the drop rate measuring unit 17 of the WAN accelerator 10 monitors TCP packets including data to be transmitted from the server 3 to the wireless terminal 7 and ACKs to the TCP packets and measures the RTT and the drop rate (S316). The burst size measuring unit 20 of the WAN accelerator 10 monitors plural TCP packets continuously transmitted in S309 to S314 and measures the burst size (S317). Thereafter, the WAN accelerator 10 updates the average burst length, the average RTT, and the average drop rate of the session monitoring table 13 using the measured RTT, the measured drop rate, and the measured burst size (S318).

The selection unit 21 of the WAN accelerator 10 selects a high-speed TCP(Z) as a high TCP with small latency and outputs an instruction for switching the protocol to the switching unit 18 (S319). Specifically, the selection unit 21 acquires the average burst length, the average RTT, and the average drop rate of the used TCP session with reference to the session monitoring table 13. Then, the selection unit 21 specifies a protocol corresponding to the acquired average burst length, the acquired average RTT, and the acquired average drop rate from the algorithm determining table 14. Thereafter, the selection unit 21 determines that the communication protocol is switched to the specified protocol.

Thereafter, when an input device of the wireless terminal 7 is operated, the wireless terminal 7 transmits an event packet to the server 3 (S320 and S321). At this time, the WAN accelerator 7a of the wireless terminal 7 switches the communication protocol from the normal TCP to the high-speed TCP and transmits the event packet using the high-speed TCP.

The transport processing unit 15 of the WAN accelerator 10 switches the communication protocol to the normal TCP and transmits the received event packet to the server 3 using the normal TCP (S322 and S323). The server 3 performs a process of an application on the event specified by the received event packet to update the screen and transmits the updated screen data to the wireless terminal 7 (S324). At this time, plural TCP packets including screen data depending on the size of the screen data are transmitted from the server 3 to the wireless terminal 7 and ACKs to the TCP packets are transmitted from the wireless terminal 7 (S325 to S330).

The processes of S325 to S330 will be specifically described below. The proxy processing unit 19 of the WAN accelerator 10 terminates the packet transmitted from the server 3 using the TCP. Then, the transport processing unit 15 transmits the packet, which is received using the normal TCP, to the wireless terminal 7 using the high-speed TCP(Z) selected in S319. The WAN accelerator 7a of the wireless terminal 7 transmits the packet, which is received using the high-speed TCP(Z), to the application using the normal TCP. Then, the application performs an image display process.

Thereafter, the WAN accelerator 7a of the wireless terminal 7 transmits an ACK, which is output from the application, to the server 3 using a high-speed TCP. Then, the proxy processing unit 19 of the WAN accelerator 10 terminates the ACK transmitted from the wireless terminal 7 using the high-speed TCP. The transport processing unit 15 transmits the received ACK to the server 3 using the normal TCP. In this way, data is transmitted and received between the wireless terminal 7 and the server 3 using a high-speed TCP(Z) with small latency. The sequence illustrated in FIG. 9 is repeatedly performed until the session is cut off.

Here, the characteristics of the protocols are evaluated through simulation, but an algorithm determining table may be prepared by acquiring an analytical solution and comparing the characteristics, in addition to the simulation. In this embodiment, the algorithm determining table is prepared in advance, but the algorithm determining table may be prepared by performing the simulation or comparing the characteristics from the analytical solution at the time point at which the average burst length, the average RTT, and the average drop rate are measured.

Advantages Effect

The WAN accelerator 10 according to the first embodiment frequently selects and uses a protocol with small latency instead of a protocol with a high throughput out of the simulation results. Accordingly, it is possible to improve the latency for a transaction communication requiring a high-speed response. Since the WAN accelerator 10 periodically updates the average burst size, the average RTT, and the average drop rate, it is possible to follow a variation in the network between the wireless terminal 7 and the server 3. That is, the WAN accelerator 10 can re-check the transport algorithm depending on the quality of the network with a predetermined period. Accordingly, since the WAN accelerator 10 can select a protocol suitable for the network, the data size, and the like frequently varying, it is possible to prevent extreme degradation of the latency.

[b] Second Embodiment

When not selecting a protocol with small latency, a WAN accelerator disclosed therein may select a protocol with a high throughput. Accordingly, in the second embodiment, when not selecting a protocol with small latency, an example of selecting a protocol with a high throughput will be described below.

Configuration of WAN Speed-Up Device

Figure 10:
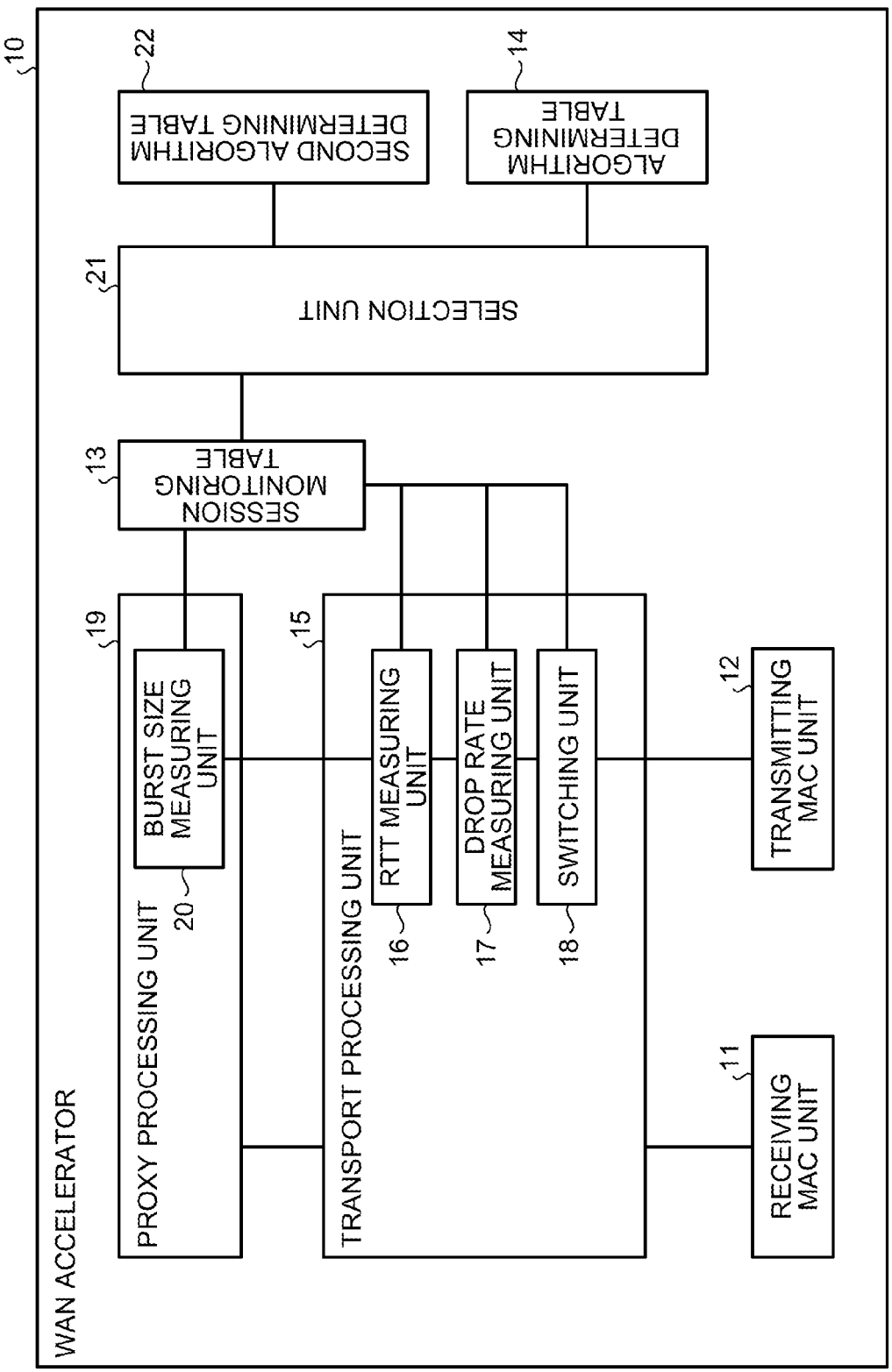
FIG. 10 is a functional block diagram illustrating the functional configuration of a WAN accelerator according to a second embodiment.

FIG. 10 is a functional block diagram illustrating the functional configuration of the WAN accelerator according to the second embodiment. The virtual WAN accelerator 7a implemented by the wireless terminal 7 also performs the same processes as illustrated in FIG. 10.

As illustrated in FIG. 10, the WAN accelerator 10 includes a receiving MAC unit 11, a transmitting MAC unit 12, a session monitoring table 13, an algorithm determining table 14, and a transport processing unit 15. The WAN accelerator 10 further includes a proxy processing unit 19, a selection unit 21, and a second algorithm determining table 22. The tables are stored in a storage device such as a memory. The respective processing units are implemented by an electronic circuit such as a CPU.

Since the second embodiment is different from the first embodiment in the processing details of the algorithm determining table 14, and the second algorithm determining table 22, and the selection unit 21, the differences will be described below.

Similarly to the first embodiment, the algorithm determining table 14 stores information for determining a protocol with small latency as a protocol to be used for WAN speed-up communications. Specifically, the algorithm determining table 14 stores information for determining a protocol on the basis of the drop rate and the RTT for each burst size. FIG. 11 is a diagram illustrating an example of an algorithm determining table according to the second embodiment.

As illustrated in FIG. 11, the algorithm determining table 14 stores the same details as described in the first embodiment with reference to FIG. 4, but is different from that in the first embodiment, in that "uncertainty" is included in the protocols to be selected. For example, the algorithm determining table 14 stores "uncertainty" as a protocol to be selected when the burst size is 15000 bytes, the drop rate (p) is less than 0.0001, and the RTT is 50 ms. This "uncertainty" indicates that any protocol may be selected.

Figures 12, 13:
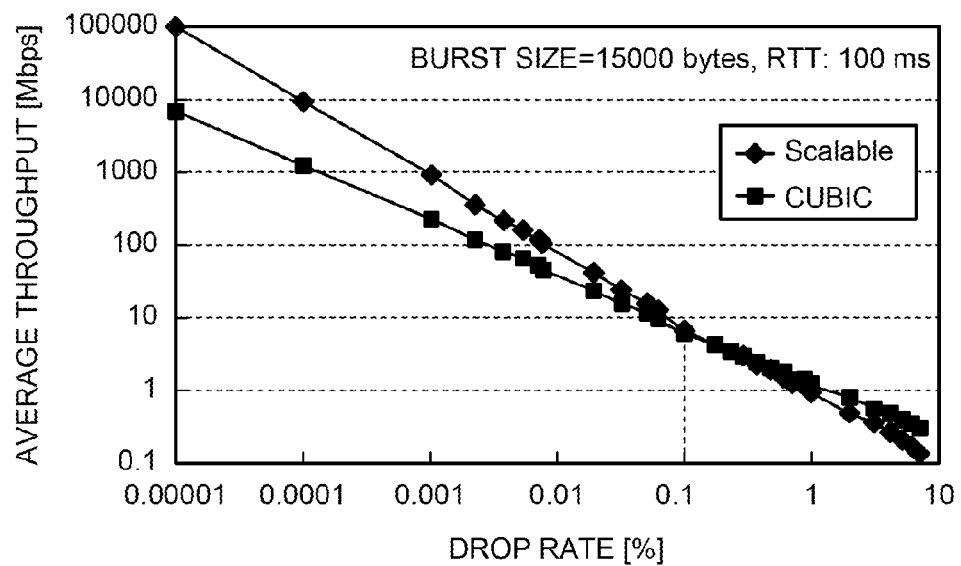
FIG. 12 is a diagram illustrating an example of a second algorithm determining table according to the second embodiment.
FIG. 13 is a diagram illustrating an example of a simulation result used to prepare the second algorithm determining table.

The second algorithm determining table 22 stores information for determining a protocol with a high throughput as a protocol to be used for WAN speed-up communications. The second algorithm determining table 22 stores information for determining a protocol on the basis of the drop rate and the RTT for each burst size. FIG. 12 is a diagram illustrating an example of the second algorithm determining table according to the second embodiment.

As illustrated in FIG. 12, the second algorithm determining table 22 stores the same details as described in the first embodiment with reference to FIG. 4, but is different from that of the first embodiment or the algorithm determining table 14 in that a protocol not with small latency but having a high throughput may be selected. For example, when the RTT is 50 and the drop rate (p) satisfies 0.1≤p<0.2, the CUBIC is selected in FIG. 12.

The preparation of the second algorithm determining table 22 illustrated in FIG. 12 will be described below. The second algorithm determining table 22 can be prepared from the simulation result of transmission of burst data. This method is effective when many uncertain factors are present in specifying a network. FIG. 13 is a diagram illustrating an example of the simulation result used to prepare the second algorithm determining table. FIG. 13 illustrates the relationship between the drop rate and the average throughput when the RTT is 100 ms.

In FIG. 13, the average throughput of the Scalable is higher than that of the CUBIC when the drop rate is smaller than 0.08, and the average throughput of the CUBIC is higher than that of the Scalable when the drop rate is greater than or equal to 0.1. As a result, as illustrated in FIG. 12, the second algorithm determining table 22 is prepared so that a protocol to be selected is switched with the drop rate of 0.1 as a boundary.

Referring to FIG. 10 again, the selection unit 21 is a processing unit that monitors the session monitoring table 13 and that selects an optimal TCP congestion control algorithm. Specifically, the selection unit 21 selects the optimal TCP congestion control algorithm even during communication with reference to FIG. 11 or 12 on the basis of the information acquired from the RTT measuring unit 16, the drop rate measuring unit 17, and the burst size measuring unit 20, switches the communication protocol, to perform a communication.

For example, the selection unit 21 monitors the session monitoring table 13 and acquires an average burst length of "15000", an average RTT of "50", and an average drop rate of "0.00007" as information of the session. Then, the selection unit 21 searches the algorithm determining table 14 for a table corresponding to the acquired average burst length of "15000". Subsequently, the selection unit 21 specifies "uncertainty" as a protocol corresponding to the conditions with an average RTT of "50" and an average drop rate of "0.0001" in the table of FIG. 11 acquired through the search.

When the selected result is "uncertainty", the selection unit 21 searches the second algorithm determining table 22 for a table corresponding to the average burst length of "15000". Subsequently, the selection unit 21 specifies "Scalable" as a protocol corresponding to the conditions with an average RTT of "50" and an average drop rate of "0.0001" from the table of FIG. 12 acquired through the search. As a result, the selection unit 21 instructs the switching unit 18 to switch the communication protocol from the TCP to the Scalable.

Flowchart

Figure 14:
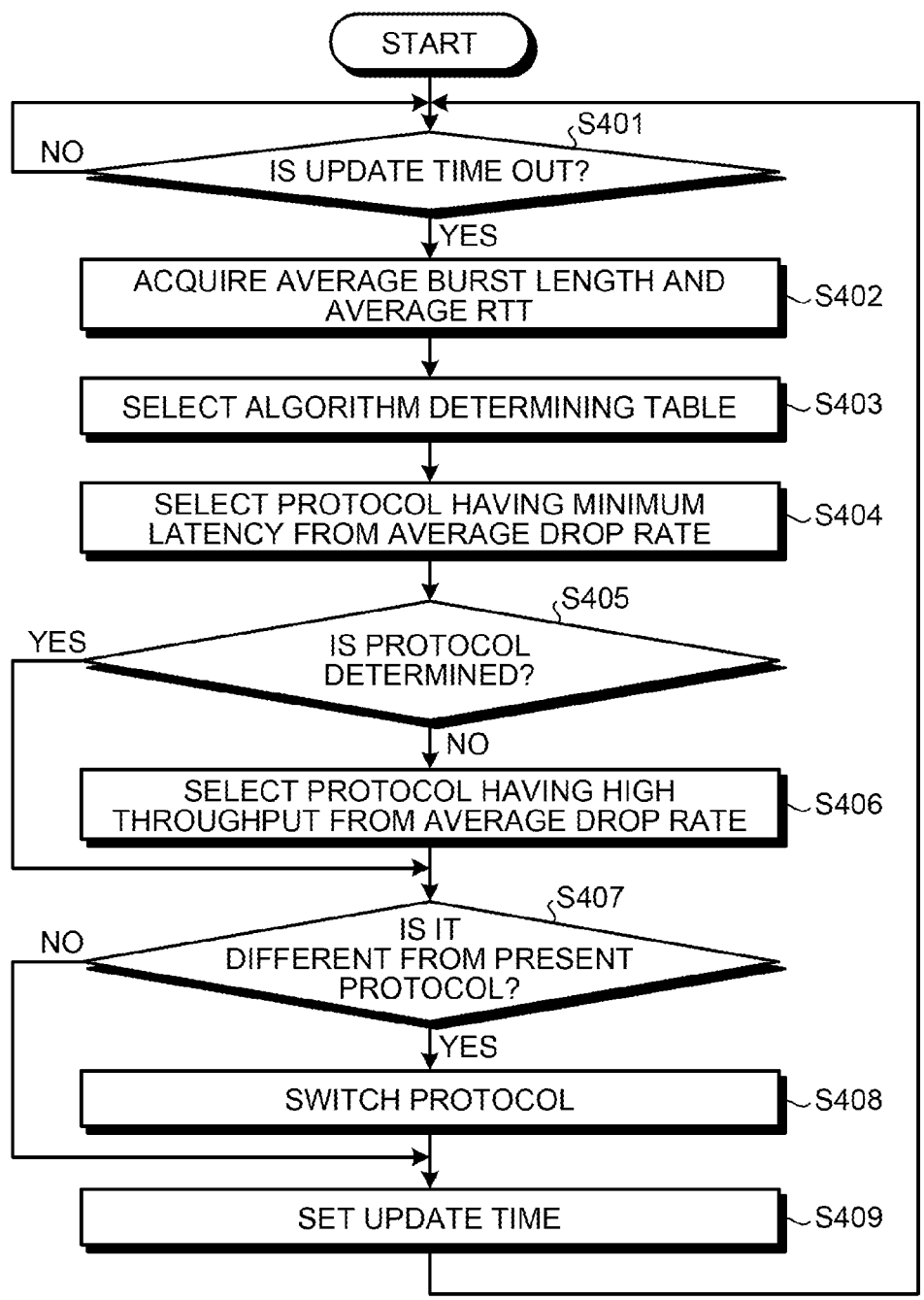
FIG. 14 is a flowchart illustrating the flow of processes which are performed by the WAN accelerator according to the second embodiment.

FIG. 14 is a flowchart illustrating the flow of processes performed by the WAN accelerator according to the second embodiment. As illustrated in FIG. 14, when the update time is out (YES in S401), the selection unit 21 of the WAN accelerator 10 acquires an average burst length and an average RTT from the session monitoring table 13 for the corresponding session (S402).

Subsequently, the selection unit 21 selects an algorithm determining table corresponding to the acquired average burst length and the acquired average RTT out of plural tables stored in the algorithm determining table 14 (S403).

Thereafter, the selection unit 21 acquires the average drop rate of the corresponding session from the session monitoring table 13 and specifies a protocol corresponding to the acquired average drop rate from the selected algorithm determining table (S404). That is, the selection unit 21 selects a protocol assumed to be small in latency based on the average burst length, the average RTT, and the average drop rate.

Then, the selection unit 21 performs the process of S406 when the specified protocol is "uncertainty", that is, when a protocol with small latency is not uniquely determined (NO in S405). That is, the selection unit 21 selects an algorithm determining table corresponding to the average burst length and the average RTT acquired in S402 out of plural tables stored in the second algorithm determining table 22. Then, the selection unit 21 selects a protocol corresponding to the average drop rate specified in S404 from the algorithm determining table selected in S402.

Then, the selection unit 21 determines whether the protocol selected in S406 is different from the present protocol (S407). Subsequently, when it is determined that the selected protocol is different from the present protocol (YES in S407), the selection unit 21 instructs the switching unit 18 to switch the communication protocol to the selected protocol (S408).

Thereafter, the selection unit 21 sets an update time for measuring a trigger for performing the flow illustrated in FIG. 14 and ends the flow of processes (S409). When it is determined that the selected protocol is not different from the present protocol (NO in S407), the selection unit 21 outputs a protocol switching instruction to the switching unit 18 and performs the process of S409.

When it is determined in S405 that a protocol with small latency is specified (YES in S405), the selection unit 21 performs the process of S407 or the processes subsequent thereto without performing the process of S406. That is, the selection unit 21 performs the same process as illustrated in FIG. 7. In the second algorithm, the characteristics of the protocols are evaluated through simulation, but an algorithm determining table may be calculated and prepared by acquiring an analytical solution and comparing the characteristics, in addition to the simulation. In this embodiment, the algorithm determining table is prepared in advance, but the algorithm determining table may be prepared by performing the simulation or comparing the characteristics from the analytical solution at the time point at which the average RTT and the average drop rate are measured.

Advantages Effect

In this way, the WAN accelerator 10 according to the second embodiment can select a protocol having a high throughput when it is considered that the latency is not changed even using any protocol. Therefore, it is possible to improve the latency at the time of transaction communications and to improve the throughput.

[c] Third Embodiment

In the first embodiment or second embodiment, the method of selecting an algorithm based on the characteristics of the congestion control algorithms having different TCPs is described. However, the same idea may be applied to a UDP (User Datagram Protocol).

In general, a UDP is a protocol in which reliability is not guaranteed and adds an error correction function to an application for surely transmitting data to the opponent. The protocols in which the error correction function is added to the UDP are broadly classified into two types. The first type is a protocol (hereinafter, also referred to as a UDP+FEC (Forward Error Correction)) having an error correction function of performing a redundant encoding in advance on the transmission side and restoring an erroneous or lost packet from the packets received by the reception side. The second type is a protocol (hereinafter, also referred to as a UDP+retransmission) having an error correction function of correcting an erroneous or lost packet through retransmission.

Figure 15:
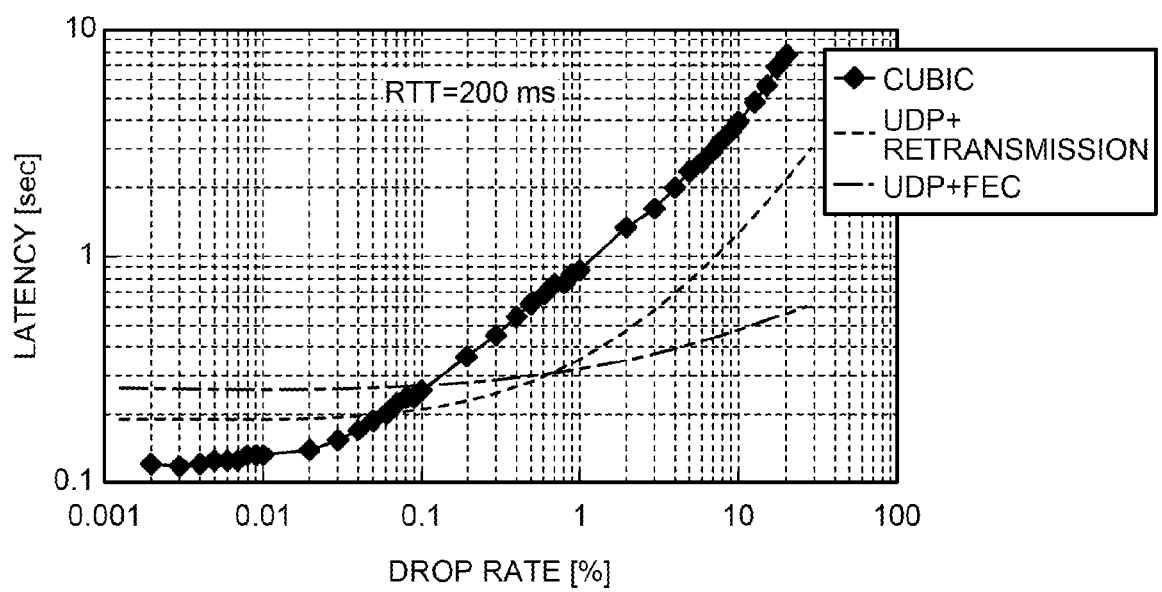
FIG. 15 is a diagram illustrating the relationship between a used drop rate and latency when a UDP is used as a high-speed protocol.

FIG. 15 is a diagram illustrating the relationship between the used drop rate and the latency when the UDP is used as a high-speed protocol. FIG. 15 illustrates the relationship between the drop rate and the latency, which is simulated when the burst size is 15000 bytes and the RTT is 200 ms. FIG. 15 also illustrates the relationship between the drop rate and the latency, which is simulated using the CUBIC in the same conditions for comparison.

The UDP+FEC type is a technique of transmitting a UDP message, in which redundant data is included in plural packets, to the opponent when the transmission side transmits data and restoring the lost message from the message correctly received by the reception side when a loss or an error occurs. In that the redundant calculation should be performed at the time of transmission or the restoring process should be performed by the reception side, the transmission and reception processes require time but the amount of data to be transmitted does not increase even with a high drop rate. Accordingly, as illustrated in FIG. 15, the latency is small in an area having a low drop rate, but the latency degrades less even with an increase in drop rate.

The UDP+retransmission type is a technique of transmitting a UDP message, in which a sequence number is included in data, to the opponent and retransmitting an erroneous or lost message in response to the acknowledged response from the opponent. Unlike the FEC type, since the redundant calculation is not performed, the transmission and reception processes are fast but the amount of retransmitted data increases with an increase in drop rate. Accordingly, as illustrated in FIG. 15, the latency in the area having a low drop rate is greater than that in the UDP+FEC type, but the latency degrades in the area having a high drop rate.

As described above, when the burst size is 15000 bytes and the RTT is 200 ms, information to be stored in the algorithm determining table 14 used by the selection unit 21 is generated. Specifically, the algorithm determining table 14 stores a table in which the UDP+retransmission protocol is selected when the drop rate is smaller than 0.8 and the UDP+FEC protocol is selected when the drop rate is greater than 0.8.

Even when the UDP is used, a control may be made to select a protocol with a high throughput, similarly to the second embodiment. For example, the example illustrated in FIG. 15 will be described below. In FIG. 15, the communication protocol is switched between the UDP+retransmission protocol and the UDP+FEC protocol with the drop rate of 0.8 as a boundary. In this case, when the drop rate is 0.8, the latency does not greatly differ between the UDP+retransmission protocol and the UDP+FEC protocol. Therefore, when the drop rate is 0.8, a protocol considered to have a higher throughput may be selected from the UDP+retransmission protocol and the UDP+FEC protocol.

In this way, even in a network using the UDP, it is possible to relay data by selecting a protocol with small latency. Since a protocol with small latency can be selected at any time regardless of the TCP or the UDP, the range of networks or systems to which the technique disclosed herein can be applied is broadened and it is thus possible to realize pleasant services.

[d] Fourth Embodiment

Although the first and second embodiments describe an example where a protocol with small latency at a certain time point is selected, the invention is not limited to this example and a protocol may be selected, for example, in consideration of a variation in latency or the like.

Figure 16:
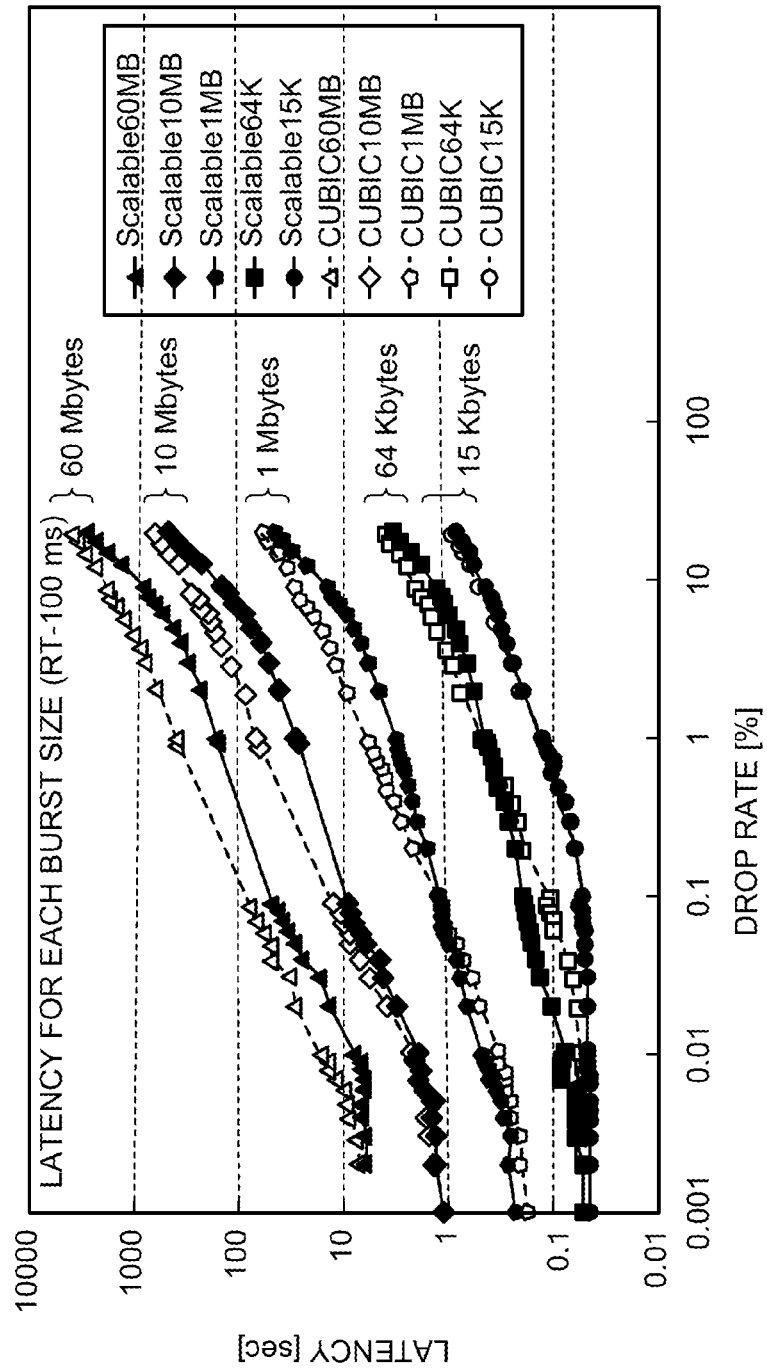
FIG. 16 is a diagram illustrating an example of a variation in latency when a burst gap is fixed and a burst size is changed.

FIG. 16 is a diagram illustrating an example of a variation in latency when the burst gap is fixed and the burst size is changed. FIG. 16 also illustrates a variation in latency of the Scalable and the CUBIC when the burst gap is set to 10 seconds.

As illustrated in FIG. 16, when the burst size is in the range of 1 Mbytes to 15 Kbytes, a window suppression phenomenon occurs due to the small number of ACKs and thus an event in which the priorities of the Scalable and the CUBIC are inverted depending on the drop rate occurs. The window suppression phenomenon means a phenomenon in which a congestion control algorithm of enlarging a congestion window depending on the number of ACKs at the time of transmitting burst data becomes smaller in enlargement of the window than a congestion control algorithm of enlarging a congestion window depending on the time.

On the other hand, when the burst size is in the range of 10 Mbytes to 60 Mbytes, the transmission approaches the bulk transfer with an increase in burst size. Accordingly, the average window size of the Scalable is greater than that of the CUBIC at any drop rate and thus the Scalable is superior in the response.

This inversion of both states depends on the burst size when the burst gap is fixed, but the burst gap varies in the actual communications and thus both states are inverted depending on a threshold value of a burst speed. The burst speed can be calculated by "average burst size/average burst gap".

Therefore, when the burst speed calculated on the basis of the average burst size and the average burst gap measured by the burst size measuring unit 20 is greater than the threshold value, an optimal algorithm is selected using the algorithm determining table based on the average throughput described in the second embodiment. On the other hand, when the burst speed is less than or equal to the threshold value, an algorithm may be selected with reference to the algorithm determining table based on the latency described in the first embodiment or the like.

Accordingly, since it is possible to follow the variation in burst size, a protocol with small latency or a protocol with a high throughput, which is suitable for the network state or the variation in burst size, can be selected depending on circumstances.

Fifth Embodiment

While the embodiments of the invention have been described hitherto, the invention is not limited to the above-mentioned embodiments but may be modified in various forms. The modified embodiments will be described below.

Protocol

The protocols such as the TCP or the UDP described in the embodiments are only examples and are not limited to the protocols described in the embodiments. Various protocols obtained by improving the TCP or various protocols obtained by improving the UDP may be employed.

Network Characteristics

The embodiments describe an example where the WAN accelerator 10 measures the drop rate or the RTT as the network characteristics through the transmission and reception of data to and from the opponent, but are not limited to this example. For example, when the drop rate or the RTT is known in advance as in a dedicated line, the WAN accelerator does not measure the drop rate or the RTT through the transmission and reception of data to and from the opponent. In this case, since the drop rate or the RTT is known in advance, the tables illustrated in FIGS. 4, 11, and 12 are prepared on the basis of the known drop rate or RTT.

Combination

The above-mentioned embodiments can be arbitrarily combined. The TCP and the UDP are described above in different embodiments, but may be combined. For example, the table illustrated in FIG. 4 or the like may be a table for selecting any one of the Scalable protocol and the UDP+ retransmission protocol.

System

All or some of the processes described to be automatically performed out of the processes described in the embodiments may be manually performed. Alternatively, all or some of the processes described to be manually performed may be automatically performed using known methods. In addition, the processing order, the control order, the specific titles, and the information including various data or parameters described in the embodiments or illustrated in the drawings may be arbitrarily changed except for specified cases.

The elements of the devices illustrated in the drawings are functionally conceptual and do not have to be physically configured as illustrated in the drawings. That is, the specific forms of distribution or combination of the devices are not limited to the drawings. That is, all or a part thereof may be configured by functionally or physically distributing or combining the elements in arbitrary units depending on various loads or usage. All or a part of the processing functions performed by the devices may be embodied by a CPU or a program analyzed and executed by the CPU or may be embodied as hardware using wired logics.

Hardware Configuration

Various processes described in the embodiments may be embodied by causing a computer system such as a personal computer or a workstation to execute a predetermined program. An example of a computer that executes a program having the same functions as described in the embodiments will be described below.

Figure 17:
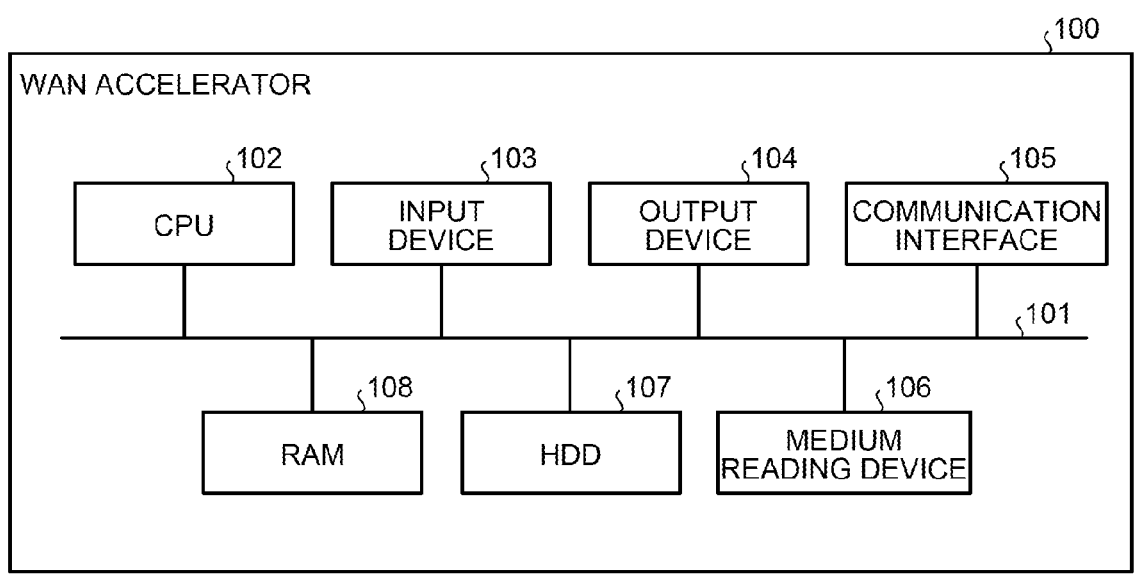
FIG. 17 is a diagram illustrating an example of a hardware configuration.

FIG. 17 is a diagram illustrating a hardware configuration. As illustrated in FIG. 17, a WAN accelerator 100 includes a CPU 102, an input device 103, an output device 104, a communication interface 105, a medium reading device 106, an HDD (Hard Disk Drive) 107, and a RAM (Random Access Memory) 108. The units illustrated in FIG. 17 are connected to each other via a bus 101.

The input device 103 includes a mouse or a keyboard, the output device 104 includes a display, and the communication interface 105 includes an interface such as an NIC (Network Interface Card). The HDD 107 stores a program performing the functions illustrated in FIG. 2 or the like and the tables described in the embodiments. The HDD 107 is mentioned as an example of a recording medium, but various programs may be stored in a recording medium which can be read by another computer, such as a ROM (Read Only Memory), a RAM, and a CD-ROM, and the programs may be read by the computer. The programs may be acquired and used by disposing the recording medium remotely and causing the computer to access the recording medium. At this time, the acquired program may be stored and used in the recording medium of the WAN accelerator itself.

The CPU 102 allows the processes for performing the functions illustrated in FIG. 2 or the like to work by reading a program executing the same processes as the processing units illustrated in FIG. 2 and developing the read program in the RAM 108. That is, these processes perform the same functions as the receiving MAC unit 11, the transmitting MAC unit 12, the transport processing unit 15, the proxy processing unit 19, and the selection unit 21. In this way, the WAN accelerator 100 serves as an information processing apparatus that performs a protocol selecting method by reading and executing a program.

The WAN accelerator 100 may perform the same functions as described in the embodiments by reading the program from the recording medium by the use of the medium reading device 106 and executing the read program. The programs mentioned in this embodiment are not limited to programs executed by the WAN accelerator 100. For example, the invention can be applied in the same way even when the programs are executed by another computer or another server or when the programs are executed by cooperation thereof.

According to an aspect of the communication control device, the communication control method, and the communication control program disclosed herein, it is possible to improve the latency at the time of transaction communications.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control device comprising:
a memory; and
a processor coupled to the memory, wherein the processor executes a process comprising:
first measuring a size of burst data transmitted from a first device through the use of a predetermined protocol in a transport layer;
selecting a protocol ruled by an algorithm with the smallest latency, which is estimated from the size of burst data measured at the first measuring and characteristics of a network, from among a plurality of protocols used in the transport layer, and
terminating the communication of the burst data transmitted through the predetermined protocol from the first device and transmitting the burst data to a destination through the use of a protocol with the smallest latency selected at the selecting.

2. The communication control device according to claim 1, wherein
the process further comprises second measuring a round trip time of a network connecting the first device and a second device, and a drop rate of data in the network, based on observation of sequences of the burst data transmitted from the first device to the second device and transmitting responses transmitted from the second device to the first device, and
the selecting includes selecting the protocol with the smallest latency expected from the round trip time and the drop rate of data in the network measured at the second measuring as characteristics of the network and the size of the burst data.

3. The communication control device according to claim 1, wherein the selecting includes selecting a protocol having the largest throughput expected from the characteristics of the network when the protocol with the smallest latency cannot be specified uniquely.

4. The communication control device according to claim 3, wherein the selecting includes selecting the protocol having the largest throughput from evaluation results of an average throughput in the case of bulk transfer referring the characteristics of the network.

5. The communication control device according to claim 1, wherein the selecting includes selecting the protocol with the smallest latency, which is estimated from the size of the burst data measured at the first measuring and the characteristics of the network, from among the protocols ruled by an algorithm of increasing a congestion window depending on the number of acknowledged responses and a protocol ruled by an algorithm of increasing the congestion window depending on the elapsed time after a congestion occurs.

6. The communication control device according to claim 1, wherein the selecting includes selecting the protocol with the smallest latency, which is estimated from the size of the burst data measured at the first measuring and the characteristics of the network, from among a protocol ruled by an algorithm of performing an error correction through retransmission and a protocol ruled by an algorithm of performing an error correction through redundant encoding.

7. A communication control method comprising:
measuring a size of burst data transmitted from a first device through the use of a predetermined protocol in a transport layer, using a processor;
selecting a protocol ruled by an algorithm with the smallest latency which is estimated from the measured size of burst data and characteristics of a network, from among a plurality of protocols used in the transport layer, using the processor; and
terminating the communication of the burst data transmitted through the predetermined protocol from the first device and transmitting the burst data to a destination through the use of the selected protocol, using the processor.

8. A non-transitory computer-readable recording medium having stored therein a program for causing a computer to execute a memory management process comprising:
measuring a size of burst data transmitted from a first device through the use of a predetermined protocol in a transport layer;
selecting a protocol ruled by an algorithm with the smallest latency, which is estimated from the measured size of burst data and characteristics of a network, from among a plurality of protocols used in the transport layer; and
terminating the communication of the burst data transmitted through the predetermined protocol from the first device and transmitting the burst data to a destination through the use of the selected protocol.

* * * * *